April 5, 1932. P. A. WEIGERT 1,852,385
CONVEYER
Filed April 14, 1930 3 Sheets-Sheet 1

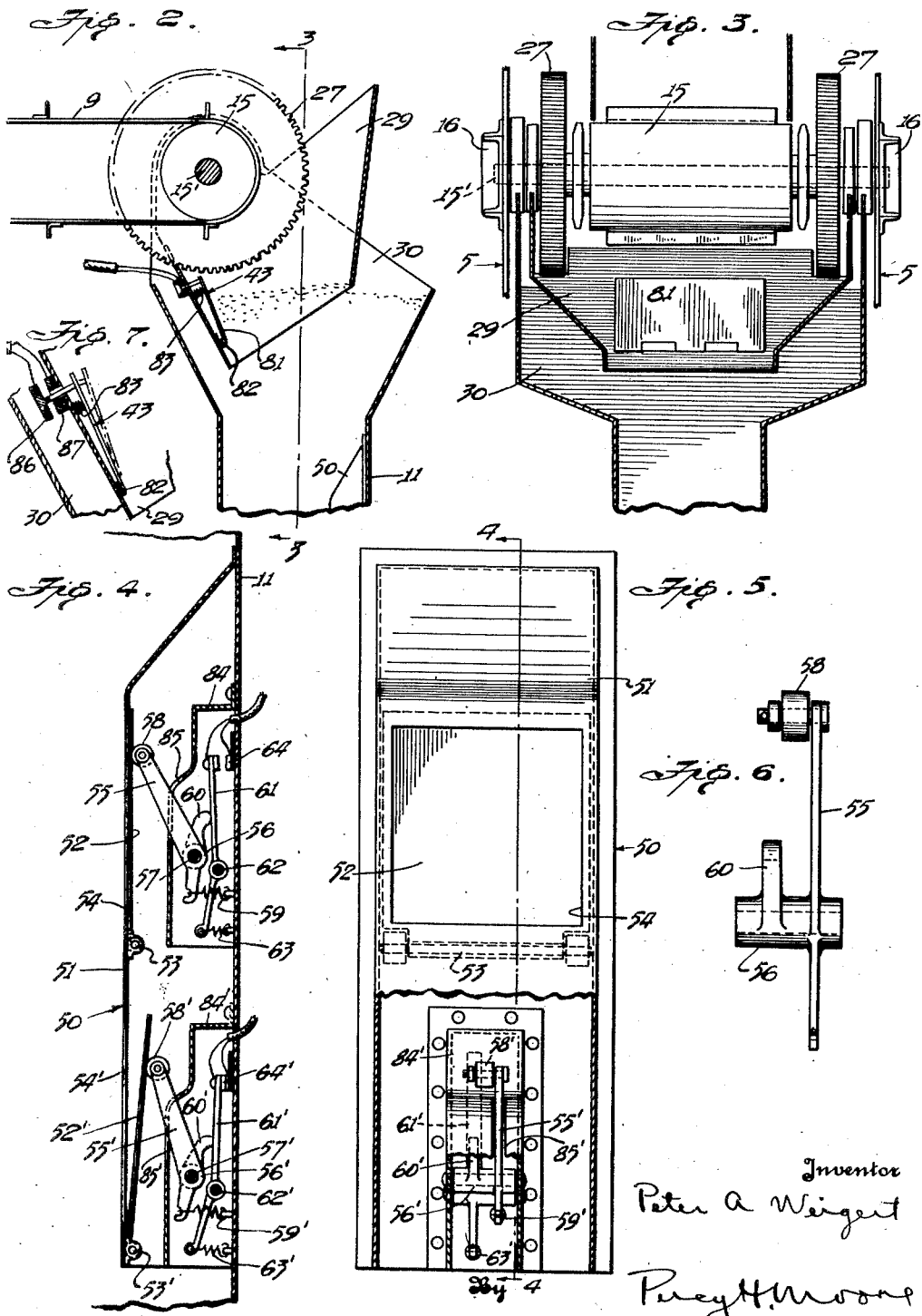

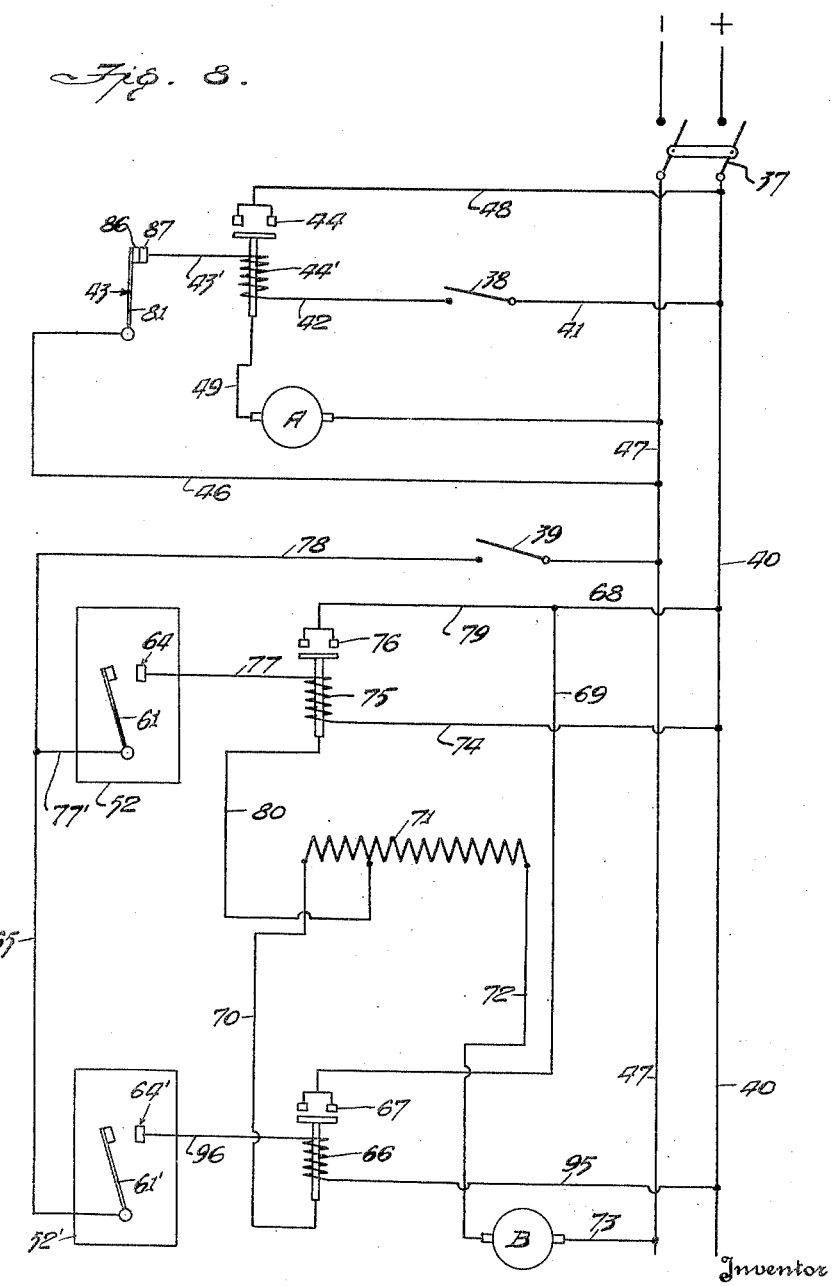

Patented Apr. 5, 1932

1,852,385

UNITED STATES PATENT OFFICE

PETER A. WEIGERT, OF BALTIMORE, MARYLAND

CONVEYER

Application filed April 14, 1930. Serial No. 444,206.

This invention relates to improvements in material conveyers and more particularly to such conveyers as are generally employed in the loading of boats and the like when it is desirable to convey or lower material from an elevated position to a lower position without degradation of the material.

The principal object of the present invention is to provide a conveying device including a trimmer belt and a discharge pipe or chute for continuously delivering material from an overhead source of supply to the trimmer, in which the height of the material in the chute will be automatically maintained at a predetermined level adjacent the receiving end of the chute, thus reducing the distance of drop and degradation of the material to a minimum.

Another object of the invention is to provide automatic means for accelerating the flow of material through the chute whenever the material in the chute backs up to a level beyond that of the height desired.

A still further object of the invention is to provide means for shutting off the overhead source of supply of material when the material in the chute reaches a predetermined height.

The invention is illustrated more or less diagrammatically in the accompanying drawings wherein:

Figure 2 is an enlarged detail, partly in section, showing one of the conveyer belts and belt drive; also the upper end of the telescopic chute;

Figure 3 is a section on the line 3—3 of Figure 2;

Figure 4 is a section on the line 4—4 of Figure 5;

Figure 5 is a front elevation partly in section of the switch mechanism and switch casing or housing;

Figure 6 is a detail of the switch arms; and

Figure 7 is a fragmentary view of the emergency switch mechanism for automatically stopping the conveyer belts.

Figure 1:
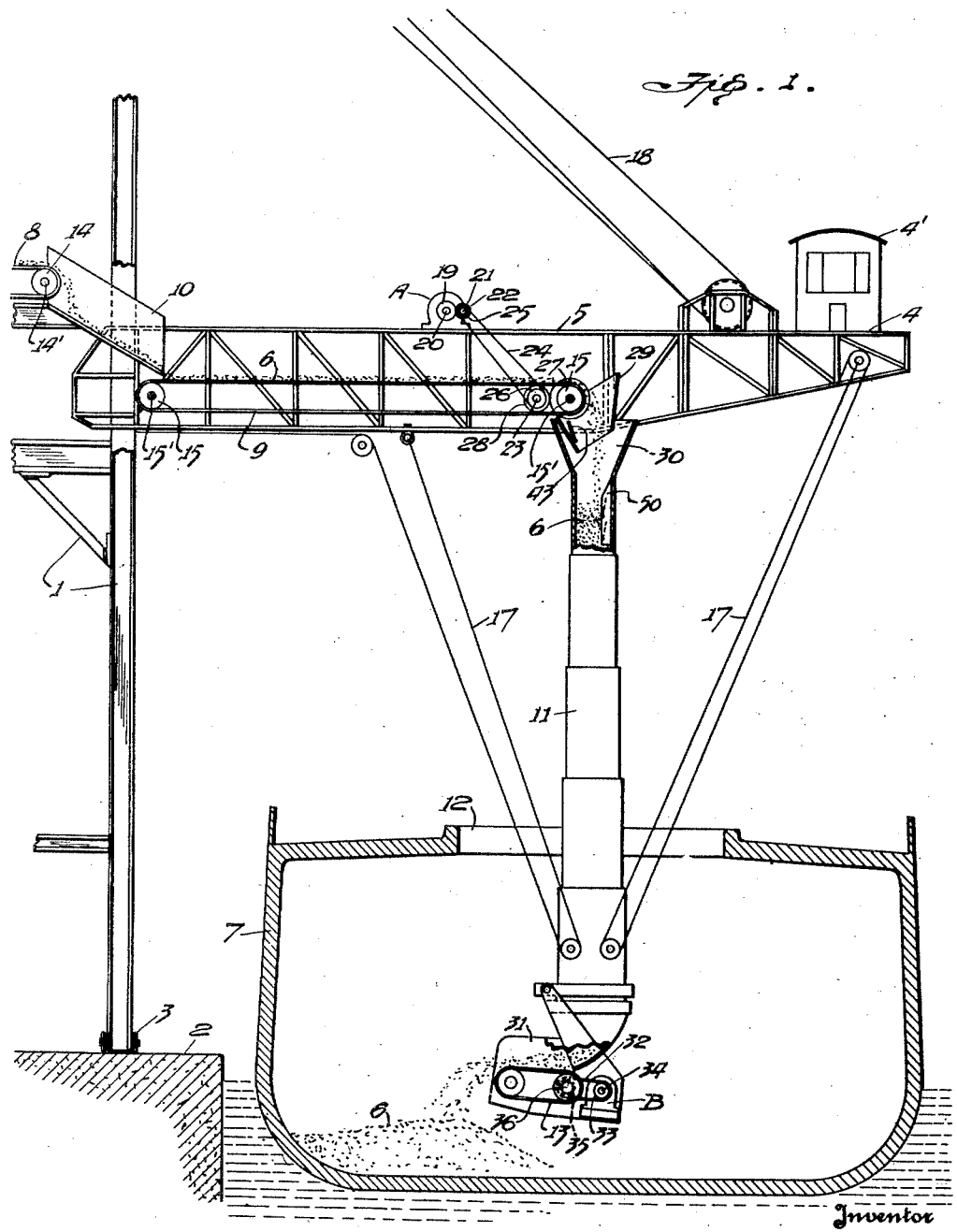
Figure 1 is a section through a boat showing apparatus in side elevation with parts broken away.

Referring more particularly to the drawings wherein like reference numerals refer to corresponding parts throughout the several views, 1 denotes a loading trestle, mounted upon a dock or other suitable base 2, wheels 3 being provided to facilitate movement of the trestle. An operator's platform 4 provided with the usual cab or housing 4', containing the usual operating mechanism, is mounted on a tiltable boom 5, in turn pivotally connected to the framework of the trestle 1.

Coal or other material 6, from a source of supply such as pockets, cars or the like not shown, is loaded into a ship or boat 7 moored adjacent the base 2, in the following manner. The material is fed to or otherwise deposited upon a conveyer belt 8 from which it is delivered to a second conveyer belt 9 by means of inclined trough shaped chute 10, and thence to and through telescopic discharge pipe or chute 11, the lower end of which extends into the open loading hatchway 12 of the vessel 7, and discharges upon the usual distributor or trimmer belt 13.

The conveyer belts 8 and 9 are mounted upon and driven by the respective pairs of drums 14 and 15, in turn suitably mounted upon drum shafts 14' and 15', and having bearings 16 in the trestle framework and boom 5 respectively. Adjacent drums 14 and 15 are connected together for simultaneous rotation in the same direction by means of a chain or belt drive (not shown). Raising and lowering of the telescopic chute 11, which is suitably secured to and depends from the boom 5, in a manner hereinafter described, is effected by means of cables 17, in an obvious and well known manner. Tiltable movement of the boom 5 on its pivot, not shown, is controlled by means of cables 18.

The conveyer belt 9 is driven by an electric motor A, mounted on the boom 5, and having a gear 19 on its driving shaft 20, which gear meshes with a small gear 21 on a shaft 22. This shaft 22 drives a shaft 23 by means of chains 24 operatively connected to sprockets 25 and 26 on the respective shafts 22 and 23, the latter shaft being positioned adjacent the front drum shaft 15' of conveyer belt 9. Fixed to this shaft 15' are a pair of gears 27 which mesh with and are driven by gears 28 on the chain driven shaft 23.

As the forward end of the top flight of the conveyer belt 9 passes over the forward drum 15, of conveyer belt 9, the material drops down through a hopper 29, loosely hung from the shaft 15' of this drum, and thence into the mouth 30 of the telescopic chute 11. The chute 11 is also loosely hung from the shaft 15', just referred to, as best illustrated in Figure 3. The trimmer or distributor belt catches the material and distributes it, at variable speed, throughout the hold of the ship 7. An electric motor B suitably secured to the lower end of the chute 11, by means of brackets 31, drives the belt 13, through chain 32, connected at one end to sprocket 33 on motor shaft 34 and at the other end to sprocket 35 on the trimmer belt drum shaft 36. Heretofore, it has been the practice to provide a variable speed hand control mechanism, operable from within the house 4', for varying the speed of motor B, but this has proven objectionable because, requiring the attention of the operator and because of the difficulty in determining with accuracy the existence of a condition within the chute 11 necessitating a change in speed of the trimmer belt.

The foregoing method is also objectionable in handling bituminous coal, coke and other friable material, due to the fact that there is considerable degradation caused by the fall of this material from the top to the bottom of the chute 11, when the level of material within the chute drops much below the mouth 30. As previously explained it has proven difficult to manually control the height of material within the chute. To obviate these objections, in accordance with the present invention, an automatically operated trimmer belt starter and flow regulator mechanism 50 and the previously mentioned conveyer belt stopping mechanism 43, are provided.

The flow regulator mechanism 50, which is enclosed within a casing or housing 51, secured to the interior of the telescopic chute 11 adjacent the mouth 30, comprises upper and lower doors 52—52', hinged to the casing 51 at 53—53' and normally closing the respective openings 54—54' formed in the casing. These doors are normally maintained in outward or closed position by arms 55—55' formed intermediate their ends with sleeves 56—56' which are loosely mounted on shafts 57—57' fixedly mounted in the casing 51. The upper ends of the arms 55—55' which are provided with door engaging rollers 58—58' are normally spring pressed against the upper inner faces of the doors by means of coil springs 59—59' secured at opposite ends to the lower end of the respective arms and to the casing. Projecting upwardly from the respective sleeves 56—56' are curved lugs 60—60' designed for engagement with the upper portions of switch arms 61—61' pivotally mounted on shafts 62—62' fixed to casing 51. The upper portions of these switch arms are normally forced outwardly into engagement with the lugs just described by means of coiled springs 63—63' secured to the lower ends of the switch arms at one end and to the casing 51 at the other end. It will thus be seen that the springs 63—63', not only normally maintain the switches 64—64' in open position but also assist in holding the doors 52—52' normally closed.

To start operation, including the actuation of the conveyer belt 9, the operator closes line switch 37 and control switches 38 and 39, all of which will be conveniently located in the operator's house on platform 4. Current flows from main line 40 through line 41, control switch 38, line 42, coil 44' of make and break switch 44, and line 43' to a normally closed emergency conveyer belt stopping switch mechanism 43, the purpose of which will be explained more fully later on. From the emergency switch mechanism 43 the current flows through line 46 back to main return line 47. This flow of current energizes coil 44' and closes normally open make and break contact switch 44. As make and break switch 44 is closed by the circuit thus described, current is also permitted to flow from main line 40 through line 48, to make and break switch 44, and thence through line 49 to the motor A, and from there back to main return line 47. The energized motor A, through the chain and sprocket connection previously referred to, will now actuate the conveyer belts 8 and 9, thus causing material to flow to the mouth of the chute 11, from whence it drops to the surface of the trimmer belt 13.

When the level of material flowing into the chute 11 reaches door 52', the side pressure of the material against the door forces the latter inwardly on its pivot thereby bringing the contacts of electric switch 64' together and closing the switch, thus setting the trimmer belt 13 in motion. The flow of current is from main line 40 through line 95 coil 66 of a normally open make and break switch 67, line 96, switch 64', line 65 and thence through control switch 39 back to main return line 47. This energizes the make and break switch 67, closing the latter and permitting the current to also flow from main line 40 through lines 68 and 69 to and through switch 67 and thence through line 70 to resistance 71 and from there through line 72 to trimmer belt, motor B and thence back through 73 to main return line 47. As the capacity or speed of the trimmer belt is normally slightly less than the speed or feeding capacity of the conveyer belt 9, the level of material in the chute will be automaticaly maintained at a point above the lower hinged end of the door 52', which it will be noted is positioned adjacent the mouth of the chute. Consequently the drop of material from the belt 9 when the trimmer belt is functioning will never be sufficient to cause degradation. However, it is impossible to so fix the speed or capacity of the respective belts, as to maintain the material above a given height and at the same time prevent the material from gradually creeping to a higher level, with danger of overflowing.

When the material in the chute rises an appreciable distance above the door 52, the latter will be forced inwardly by the side pressure of the material, and the switch 64 will be closed. As the construction and operation of the mechanism for closing the switch 64 is precisely the same as that described in connection with the operation of switch 64', further description will be unnecessary, except to say that closing of switch 64' starts the trimmer belt in motion whereas closing of switch 64 results in the speed of the trimmer belt being accelerated, in a manner presently understood. Flow of current, incident to the opening of door 52 and the closing of switch 64 is from main line 40 through line 74, coil 75 of make and break switch 76, line 77 to and through switch 64 to line 77' and thence back to main return line 47 through line 78 and switch 39. Coil 75 thus becomes energized, causing the normally open make and break switch 76 to close thus permitting the current to also flow from main line 40 through line 79 to and through make and break switch 76, line 80 to resistance 71 and thence to the motor B through line 72 and back to main return line 47 through line 73. As the resistance is thus lessened, the speed of motor B and trimmer belt 13 will be accelerated. Should this speeding up of the trimmer belt cause the level of material in the chute to drop below the door 52, the latter will automatically close, and thus permit the switch 64 to open under the action of coil springs 59—63 and arms 55—61. Make and break switch 76 would then become deenergized, thus breaking flow of current from main line 40, line 79, switch 76 etc. to resistance 71, with consequent increase of resistance and slowing down of motor B and trimmer belt, until the material again reaches an abnormally high level. It will thus be seen that the level of material in the chute is automatically reduced to the level of the door 52.

In the event that material in the chute 11 should rise to such an extent that there would be danger of it overflowing at the mouth 30, as sometimes happens, particularly in the handling of lumpy material, a plate 81 pivoted at 82 to the inner face of the hopper 29, previously described as extending into the mouth 30 of the chute 11, will be forced outwardly by the side pressure of the material in the hopper against the action of a coil spring 83. This plate carries the electrical contact 86, of emergency electric switch 43, previously referred to, and when the plate is moved outwardly on its pivot 82, in the manner just described, the contact 86 will be moved away from the fixed contact 87, thus opening the switch 43. When the normally closed switch 43 is opened, current from main line 40 through line 41 will be shut off and the motor A which drives the conveyer belts will stop.

The plate 81, is preferably protected by a suitable flexible covering, not shown, which will prevent the material from interfering with its action. It will also be noted that the mechanical parts for actuating the switches 64—64' all of which are in the path of material flowing through chute 11, are not only protected by the casing 51 but also by the hoods 84—84'. These hoods are open at their lower ends, as is the casing 51, to permit the ready escape of any material that may find its way to the interior of these protective members. Slots 85—85' are formed in the hoods through which the arms 55—55' extend with freedom of operation.

Having thus described my invention, what I claim is:

1. A conveyer comprising a closed conduit for delivering material in a substantially solid column, means for delivering such material to said conduit, movable means adjacent the discharge end of said conduit for receiving and conveying said material to one side of the conduit, a motor for driving said movable means, means actuated by the pressure of material in the conduit for automatically starting the motor when the material reaches a predetermined height, additional means operable for automatically accelerating the speed of the motor when the material rises above said height.

2. A conveyer comprising a closed conduit for delivering material in a substantially solid column, means for delivering such material to said conduit, movable means adjacent the discharge end of said conduit for receiving and conveying said material to one side of the conduit, an electric motor for driving the said movable means, means actuated by the pressure of material in said conduit for starting the electric motor when the level of the column of material in said conduit reaches a predetermined level, a resistance in the electric motor circuit, and means actuated by the pressure of material in the conduit for lessening said resistance and speeding up the motor, when the level of material rises beyond said predetermined level.

3. A conveyer comprising a discharge pipe for delivering a substantially solid column of material from a higher to a lower level, an upper conveyer for delivering such material to the receiving end of said pipe, a lower conveyer disposed adjacent the discharge end of the pipe for receiving and conveying said material to one side of said pipe, independent electric motors for driving said conveyers, independent means positioned in said pipe and actuated by the pressure of material therein, adapted to successively start the motor of the lower conveyer, then increase the speed of the lower conveyer motor and finally shut off the upper conveyer motor, as the level of material in said pipe progressively reaches the level of said independent means.

4. A conveyer comprising a closed conduit for delivering material in a substantially solid column, means for delivering such material to said conduit, movable means adjacent the discharge end of said conduit for receiving and conveying said material to one side of the conduit, a motor for driving said movable means, means actuated by the pressure of material in the conduit for automatically starting the motor when the material reaches a predetermined height, additional means operable for automatically accelerating the speed of the motor when the material rises above said height, said additional means also adapted to automatically reduce the motor speed to normal, when the level of material drops below said predetermined height.

In testimony whereof I affix my signature.

PETER A. WEIGERT.